(12) United States Patent
Venkatesh et al.

(10) Patent No.: US 8,978,107 B2
(45) Date of Patent: Mar. 10, 2015

(54) METHOD AND SYSTEM FOR ENABLING NON-INTRUSIVE MULTI TENANCY ENABLEMENT

(75) Inventors: Madhava R. Venkatesh, Tamil Nadu (IN); Rajesh Venkatesan, Tamil Nadu (IN); Vijay Rao, Karnatka (IN); Shaheeda Mohamed Mohideen, Tamil Nadu (IN)

(73) Assignee: HCL Technologies Limited (IN)

( * ) Notice: Subject to any disclaimer, the term of this patent is extended or adjusted under 35 U.S.C. 154(b) by 85 days.

(21) Appl. No.: 13/253,613

(22) Filed: Oct. 5, 2011

(65) Prior Publication Data

US 2013/0091547 A1 Apr. 11, 2013

(51) Int. Cl.
*H04L 29/00* (2006.01)
*G06F 7/00* (2006.01)
*G06F 21/62* (2013.01)
*G06F 21/00* (2013.01)
*G06F 21/31* (2013.01)
*G06F 17/30* (2006.01)

(52) U.S. Cl.
CPC .............. *G06F 7/00* (2013.01); *G06F 21/6218* (2013.01); *G06F 21/00* (2013.01); *G06F 21/31* (2013.01); *G06F 17/30289* (2013.01)
USPC ............................................................. 726/4

(58) Field of Classification Search
None
See application file for complete search history.

(56) References Cited

U.S. PATENT DOCUMENTS

| | | | |
|---|---|---|---|
| 6,732,100 B1 * | 5/2004 | Brodersen et al. ..................... 1/1 |
| 7,503,031 B2 | 3/2009 | Chang et al. | |
| 8,140,576 B1 * | 3/2012 | Viripaeff et al. .............. 707/781 |
| 8,271,536 B2 * | 9/2012 | Amradkar et al. ............ 707/802 |
| 8,321,921 B1 * | 11/2012 | Ahmed et al. ..................... 726/7 |
| 2008/0082540 A1 * | 4/2008 | Weissman et al. ................ 707/9 |
| 2008/0086482 A1 | 4/2008 | Weissman | |
| 2010/0205216 A1 * | 8/2010 | Durdik et al. ................. 707/783 |
| 2012/0173581 A1 * | 7/2012 | Hartig et al. .................. 707/781 |
| 2013/0081109 A1 * | 3/2013 | Venkataraman et al. ......... 726/4 |

* cited by examiner

*Primary Examiner* — Minh Dinh
(74) *Attorney, Agent, or Firm* — Finnegan, Henderson, Farabow, Garrett & Dunner, L.L.P.

(57) ABSTRACT

A system for enabling non-intrusive multi tenancy enablement in an application may include a processing unit configured to, among other things, identify a data isolation mechanism available in said application, create a centralized multi-tenant database, generate a controlled provisioning layer to manage relationships between a set of consumers and a corresponding entity uniquely developed for said consumers, and generate a multi-tenant wrapper interface for managing relationship(s) between said consumers and instances of the application. The system may further include a memory unit configured to host said centralized customer database to manage users and associated access privileges in said application.

12 Claims, 3 Drawing Sheets

An exemplary underlying architecture of the present invention

METHOD AND SYSTEM FOR ENABLING NON-INTRUSIVE MULTI TENANCY ENABLEMENT

FIELD OF TECHNOLOGY

The present disclosure generally relates to field of enabling multi tenancy in applications so as to deliver the associated product/service based on on-demand models and more particularly to the field of enabling such multi tenancy in applications in a non-intrusive manner.

BACKGROUND

Multi-tenancy refers to a principle in software architecture where a single instance of the software runs on server hardware, serving multiple client organizations (tenants) on end devices or on field assets. This architecture pattern is predominantly in use by products that are enabled to be delivered in an on-demand model e.g. SaaS (Software as a Service).

Software as a service (SaaS) sometimes referred to as "software on demand," is software that is deployed over the internet and/or is deployed to run behind a firewall on a local area network or personal computer. With SaaS, a typical provider licenses an application to customers either as a service on demand, through a subscription, in a "pay-as-you-go" model, or (increasingly) at no charge. This approach to application delivery is part of the utility computing model where all of the technology is in the "cloud" and is accessed over the Internet as a service.

The typical advantages of the SaaS (Software as a Service) include anytime, anywhere accessibility, pay as you go, instant scalability, security, reliability, and APIs (Application Program Interfaces).

Traditionally software products have been built in the past for license based deployment models. There is an ever increasing demand for making the products to be delivered in an on-demand based model. For achieving higher efficiency, there is an ever growing focus on these products to make this on-demand based model adapt to a multi-tenant based architecture.

Software products can be broadly categorized as follows.
1. Enterprise software products, e.g. SAP ERP
2. Infrastructure software products e.g. Vmware virtualization products
3. and Consumer products e.g. Microsoft Office Suite Multi-tenancy is an important need for delivering Software-On-Demand as it provides huge cost savings by allowing sharing of computing resources among multiple customers.

Typically, in a multitenant environment, multiple customers share the same application, running on the same operating system, on the same hardware, with the same data-storage mechanism. The distinction between the customers is achieved during application design, thus customers do not share or see each other's data.

A typical ideal approach to make an on-demand based model 'multitenant' is to re-architect and reengineer the product from scratch. However, this approach leads to significant disadvantage in terms of cost and time and is not a practical solution always.

The present invention describes a non-intrusive approach for multi-tenancy enablement. The non-intrusive approach of the present invention uses existing security isolation capabilities in an application/product.

The benefits of this 'non-intrusive' approach, for an Independent Software Vendor include (but not limited to)

Rapid enablement of the product to be delivered as a service.

Allows the product vendors to continue to sell the same product both via traditional license model and also in a multi-tenant SaaS based model To make this technical approach feasible the existing product needs to have a data-isolation mechanism. The present invention also allows for determination of the presence of such data isolation mechanism.

US 2008/0086482 A1, "Method and system for allowing access to developed applications via a multi-tenant on-demand database service", relates to methods for allowing access to developed applications via a multi-tenant on-demand database service, but it fails to disclose the non-intrusive technical scheme of multi tenancy enablement of the present invention wherein existing security isolation capabilities in the application are used and a wrapper is used on top of the existing application to provide the multi-tenancy without actually modifying any of existing application code.

Further, US 2008/0086482 A1 does not disclose identification of data-isolation layer and building of a controlled provisioning layer that manages the relationship between the customer and the entity that is uniquely created for that customer.

The multi tenancy wrapper of the instant invention performs these functions on the application through existing API's or web services exposed by the application and US 2008/0086482 A1 fails to disclose the same technical feature.

U.S. Pat. No. 6,732,100 B1, "Database access method and system for user role defined access", relates to database access where a user's access rights to specific data items are defined dynamically, that is, in real time, based on the user's status at the time of access request, and data and user attributes having independent utility and significance apart from access and visibility.

U.S. Pat. No. 6,732,100 B1 also supports multi tenancy support with respect to CTI [Computer Telephony Integration] applications and solves problems associated with the situation of a plurality of merchants and/or financial services organization vendoring out their telephone services and data processing operations to a common vendor.

The present invention is not directed to a database management system as such and the centralized customer database of the present invention—manages the users and access privileges of these users in the application that is to be enabled with multi-tenancy. Also, this database only comprises of a part of solution envisaged.

U.S. Pat. No. 6,732,100 B1 also does not disclose or fairly suggests in any way use of existing security isolation capabilities in the application and introduce a wrapper on top of the existing application to provide the multi-tenancy without having to modify any of existing application code.

U.S. Pat. No. 7,503,031 B2, "Method of transforming an application into an on-demand service" relates to information handling and particularly to software development, installation and management.

U.S. Pat. No. 7,503,031 B2 provides a method of transforming an application, and deploying it as an "on-demand-service" (ODS) an application made accessible via a network, such that user or application provider pays only for resources it uses, or such that resources can shrink and grow depending on the demands of the applications.

However, U.S. Pat. No. 7,503,031 B2 also does not suggests in any way the technical scheme of using existing security isolation capabilities in an application and introduction of a wrapper on top of the existing application to provide the multi-tenancy without having the need to modify any of existing application code.

Thus, none of said documents describe the technical scheme of present invention. Inclusion of non intrusive multi-tenancy as described in the present invention involves no re-engineering of the product and acts as a distinct advantage for the vendor. This also allows for rapid enablement of a software product that is to be delivered as a service.

Further, the present invention allows the product vendors to continue to sell the same product both as a traditional license model and also in a multi-tenant SaaS (Software as a Service) based model. The technical scheme of the present invention can also be successfully extended to Enterprise applications that profile closer to products and need to be accessed as a chargeback service. The present invention also enables rapid roll outs of new feature sets/newer product versions without necessitating changes for the same to be delivered as a service.

SUMMARY

An embodiment of the present invention provides a method and system for rapid enablement of a [software] product to exhibit multi tenancy.

Another embodiment of the present invention allows the multitenant software product to be delivered as a service.

Another embodiment of the present invention provides a non-intrusive approach for multi tenancy enablement and uses existing security isolation capabilities in the application.

A yet another embodiment of the present invention introduces a wrapper on top of the existing application such that no modification of the existing application code is required to exhibit the multi tenancy.

DETAILED DESCRIPTION

The various features of the preferred embodiment of present invention together with its objects and advantages thereof may be best understood by reference to the description taken in conjunction with the accompanying schematic drawing(s) of the architecture.

The present invention provides for rapid enabling any product/application to multi-tenancy without having to go through reengineering or re-architecting of the existing code base.

The present invention is configured to be used in any application that provides granular access control mechanism and which can be controlled when provisioning a user in the application. Also there must be an isolation mechanism available in the application (to be configured for multi tenancy) based on the access control mechanism available.

Figure 1:
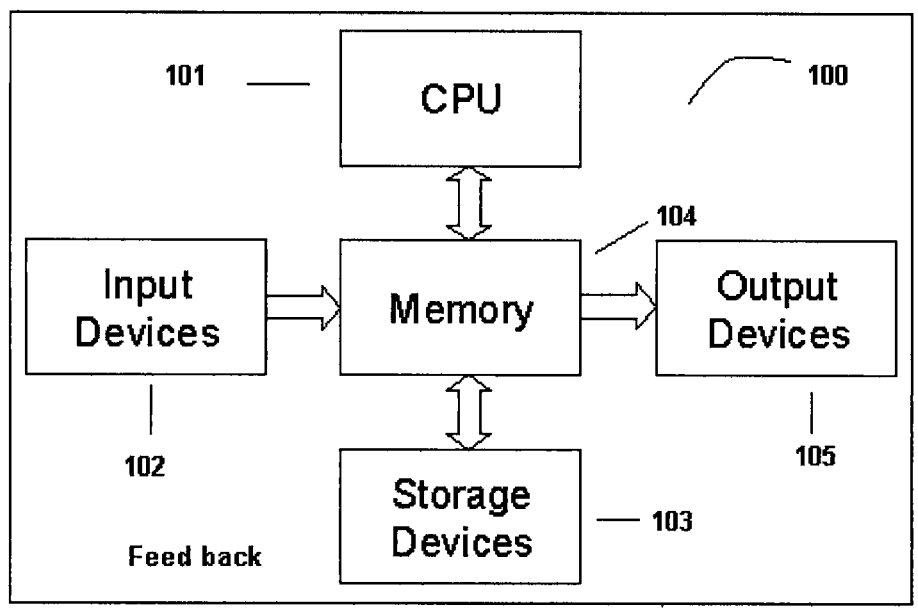
FIG. 1 illustrates an exemplary architecture of the present invention.

FIG. 1 of the present invention illustrates an exemplary architecture of the present invention. In particular, the novel method of the present invention is adapted to be executed on a configured processor/CPU/PROCESSING UNIT [101] as illustrated thereon.

In the present method of instant invention for enabling non-intrusive multi tenancy enablement in an application, the processor [101] is configured to identify a data isolation mechanism available in said application;

create a centralized multi-tenant database on a memory unit [103];

generate a controlled provisioning layer to manage relationships between a set of consumers and a corresponding entity uniquely developed for said consumers;

generate a multi-tenant wrapper interface for managing relationship(s) between said consumers and instances of the application, by said processing unit and host said centralized customer database to manage users and associated access privileges in said application by a Memory unit.

The non-intrusive technical approach of the present invention comprises of:

1. Identification of the data-isolation layer: This step comprises of identifying a data-isolation mechanism available in the existing application that is to be enabled for exhibiting multi-tenancy. Typical applications provide such data isolation mechanisms through existing entities e.g. Groups, Departments, sites etc.

The present day software applications have inbuilt security architecture to provide for limited access to available operations and data based on the assigned privileges to a user.

The privilege assigned to a user allows him/her to access a limited set of data for which the user is authorized. This is known as "data isolation" and to implement the same above mentioned software products make use of inbuilt divisions such as group, organization and departments. Existence of such division or mechanism is made use of by mapping an organization to such data isolation mechanism (group for instance) and ensuring that the users of such organization created within the application does not have the privilege to access data outside their isolated environment (i.e. outside the group they belong to). This way, multi-tenancy is enforced.

This isolation mechanism provides necessary access restrictions to the users and the entities that are managed by the application. Applications that implement a more robust access control mechanism are more capable of providing such data isolation mechanism.

2. Centralized customer database: In the present invention a centralized customer database is provided that manages the users and access privileges of these users in the application that is to be enabled with multi-tenancy.

An existing application doesn't understand i.e. cannot interpret multi-tenancy. Hence an external system (i.e. a centralized customer database) is needed that provides a list of organizations, their users and the mapping established with the isolation layer.

3. Controlled provisioning: Once such a data isolation layer in the application is identified, then a controlled provisioning layer is developed. The controlled provisioning layer is configured to manage the relationship between the customer and the entity that is uniquely created for that customer.

When a customer wants to provision more of such entities (for example: multiple departments within the customer's organization), the provision layer is capable of maintaining the relationship. Users with lesser privileges can also be controlled through the current access control mechanisms.

4. The provisioning layer manages the relationship between the organization/tenant and the data isolation. When a new organization is started off, this layer creates an appropriate entity that defines an isolation (e.g. a group) and then manages all the sub entities to be created within said isolation established for the tenant. This also includes the users within the tenant. The mapping information is stored in the centralized customer database.

5. Multi-tenancy wrapper: Users with higher level of privileges like administrators typically have higher level access to the application. Since the application is to be enabled for multi-tenancy, the administrators of individual companies should not get access to the users and data that belong to other companies. The administrators typically have higher access privileges, and it is necessary to reduce these access privileges by building a multi-tenant wrapper providing the bare minimum administrative capabilities for these "administrative" users.

The administrative users will be provisioned in the actual application as normal users, but the wrapper would recognize them as administrative users and provide them with ability to perform administrative functions. The multi-tenancy wrapper can perform these functions on the application through existing API's [Application Program Interfaces] or web services exposed by the application that is to be enabled for multi tenancy.

The present invention also provides for the following attributes
1. Single sign-on The present invention provides for a single sign-on infrastructure that is configured to use the centralized customer database for identity and access control. Single sign-on infrastructure of the present invention integrates the multi-tenant wrapper with the application to be configured/enabled for multi tenancy to support a single authentication mechanism.
2. Multi-Instance Management: As one application cannot handle infinite number of Customers, there are multiple instances of the application and the customers are distributed among these applications based on various attributes of the subscription. Thus a provision/mechanism is needed to manage the mapping between a customer and the instance in which such customer is provisioned.

Figure 2:
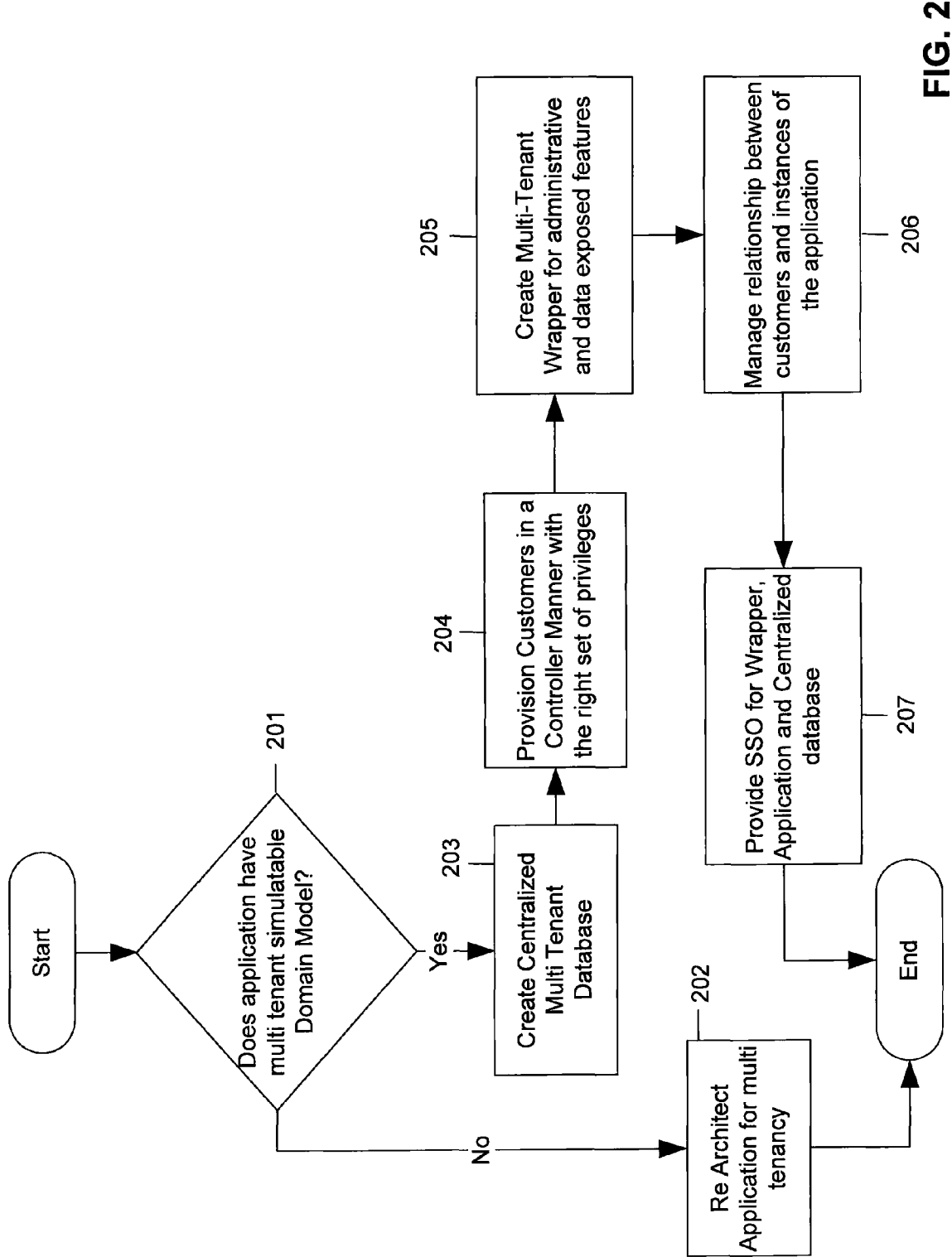
FIG. 2 illustrates a process flow diagram depicting steps in Non-Intrusive Multi-tenancy enablement of an application.

Now referring to FIG. 2 of the present invention for depicting steps in Non-Intrusive Multi-tenancy enablement of an application.

Before converting an application in to a multitenant application, it is determined whether it has a multitenant simulatable domain model [201]. In case the application doesn't support a multitenant simulatable domain model, then the only alternative is to re architect the application for multi-tenancy [202]. Such an application with no inbuilt support for a multi-tenant simulatable domain model cannot be configured for multitenancy.

In case the application supports a multitenant simulatable domain model, then a centralized multi-tenant database is created [203]. Thereafter customers are provisioned in a controlled manner with appropriate set of privileges [204]. This is followed by creation of a multi-tenant wrapper for administrative and data exposed features [205]. This is achieved by incorporation of a wrapper on top of the existing application to provide the multi-tenancy without having to modify any of the existing application code.

A wrapper acts as an "add-on" interface on top of an existing application/product and allows making calls to the APIs (Application Programming Interfaces) exposed by the underlying product/application.

Once such data isolation is identified and established, a layer is needed to maintain the organization mapping with the security isolation so created. This layer is built as an extension on top of the existing application and is termed as a "wrapper" management interface using the existing APIs/web services exposed by such an application. The typical function(s) performed by the wrapper of the present invention can be described as follows.

When a new organization/tenant is required to be created in the application, the wrapper of the instant invention provides for a provisioning interface that maps the organization with the data isolation mechanism available in the application i.e. it creates a group, advantageously assuming that the underlying application indeed provides for data isolation through said group.

Further, the wrapper also ensures that all the operations on the application have the context of the organization (i.e. data isolation).

The multi-tenant wrapper is used for managing relationship between customers and instances of the application [206]. The next step is the inclusion of Single Sign On facility for multitenant wrapper, application and centralized database.

Figure 3:
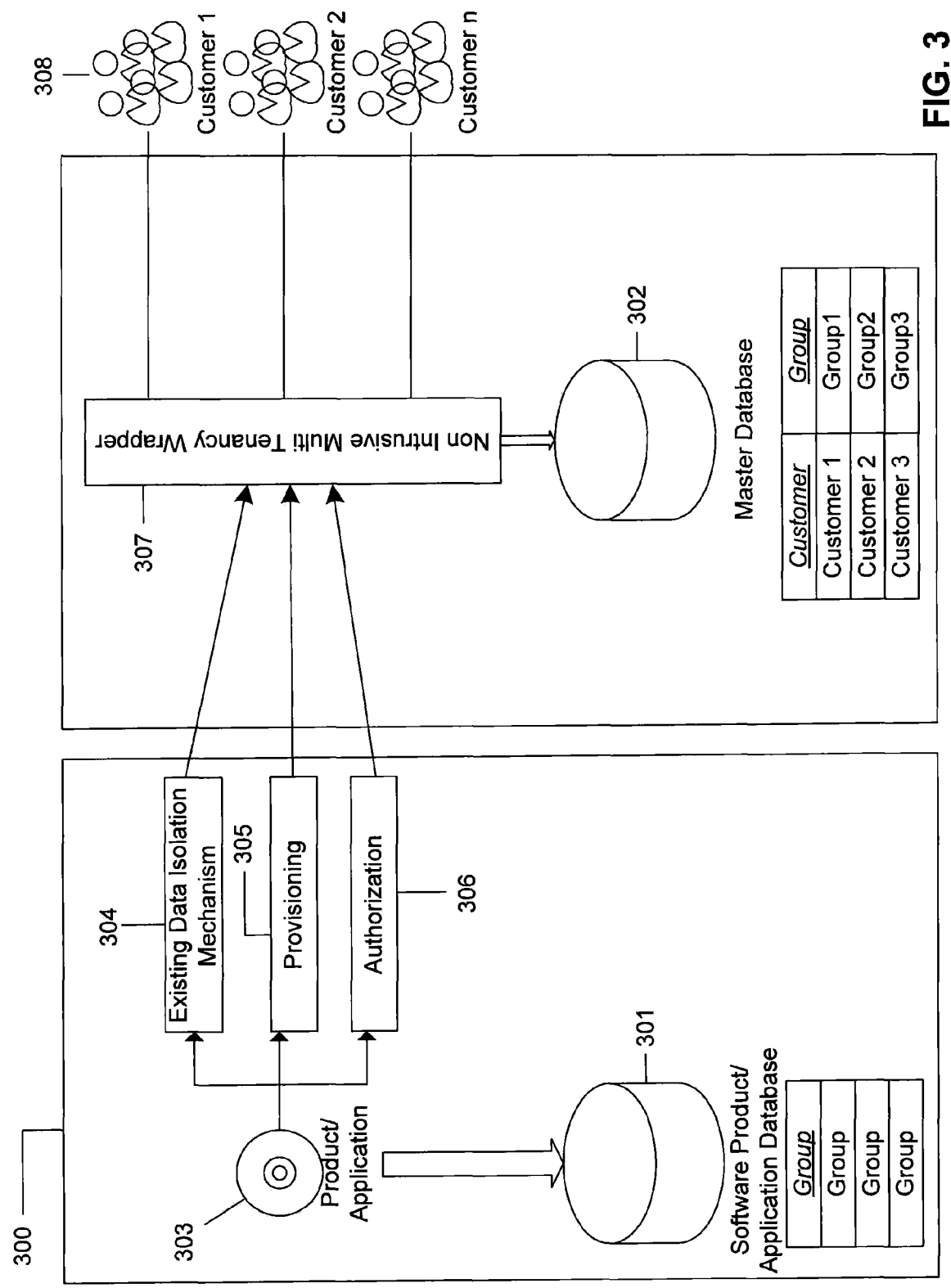
FIG. 3 illustrates an exemplary multitenant database of the present invention.

FIG. 3 illustrates the underlying database architecture [300] of the present invention. The database architecture [300] comprises of an application database [301] on which the software product to be enabled for multi tenancy resides and a corresponding multitenant master database [302] that is adapted to subsequently host multitenant software application.

As earlier described, the software product application [303] that is to be enabled for multitenancy is validated for presence of existing data isolation mechanism [304], provisioning [305], and authorization [306], as already described.

Thereafter non-intrusive multitenancy wrapper [307] configured for managing relationship(s) between consumers/customers [308] and instances of the application allows multitenancy enabled software product applications to be hosted on multitenant master database [302].

The present invention is not intended to be restricted to any particular form or arrangement, or any specific embodiment, or any specific use, disclosed herein, since the same may be modified in various particulars or relations without departing from the spirit or scope of the claimed invention herein shown and described of which the apparatus or method shown is intended only for illustration and disclosure of an operative embodiment and not to show all of the various forms or modifications in which this invention might be embodied or operated.

We claim:
1. A system for non-intrusively enabling multi-tenancy in a non-multi-tenancy application, comprising:
   a hardware processor; and
   a memory unit storing processor-executable instructions comprising instructions to:
      create a centralized customer database;
      generate a multi-tenant wrapper interface configured to:
         control access of a non-multi-tenant application to the customer database, and
         control user access privileges to the non-multi-tenant application; and
      store the centralized customer database.
2. The system of claim 1, wherein the non-multi-tenant application includes a data isolation mechanism providing predetermined set of authorized user data access privileges.
3. The system of claim 2, wherein multi tenancy in the non-multi-tenant application is enabled by mapping an organizational structure to said data isolation mechanism such that users of an organization created within the application are not authorized to have the privilege to access data outside their isolated environment.

4. The system of claim 2, wherein the centralized database is configured to store organization data, associated users and mapping information associated with the data isolation mechanism.

5. The system of claim 2, wherein the multi-tenant wrapper interface is configured to act as a provisioning interface that maps the organizational structure with the data isolation mechanism available in said application.

6. The system of claim 1, wherein a Single Sign On facility is provided for the multitenant wrapper, said application and the centralized database.

7. A method for enabling non-intrusive multi tenancy enablement in a non-multi-tenant application, comprising the steps of:
   identifying, via one or more hardware processors, a data isolation mechanism available in a non-multi-tenant application;
   creating a centralized customer database;
   generating, via the one or more hardware processors, a multi-tenant wrapper interface configured to:
      control access of the non-multi-tenant application to the customer database, and
      control user access privileges to the non-multi-tenant application; and
   storing said centralized customer database.

8. The method of claim 7, wherein the step of identifying the data isolation mechanism comprises the step of providing authorizing user data access privileges.

9. The method of claim 7, wherein multi tenancy enablement comprises the step of mapping an organizational structure to said data isolation mechanism such that users of organization created within the application are not authorized to access data outside their isolated environment.

10. The method of claim 7, wherein hosting the centralized customer database comprises the step of storing organization data, associated users and mapping information associated with the data isolation mechanism.

11. The method of claim 9, wherein the step of generating the multi-tenant wrapper interface comprises the step of configuring the multi-tenant wrapper interface to act as a provisioning interface for mapping the organizational structure with the data isolation mechanism available in said application.

12. The method of claim 7, wherein a Single Sign On facility is provided for multitenant wrapper, application and the centralized customer database.

* * * * *